(12) United States Patent
Cheng et al.

(10) Patent No.: US 10,488,069 B2
(45) Date of Patent: Nov. 26, 2019

(54) GENERATION OF COORDINATED CONTROL COMMANDS FOR GROUPINGS OF HEATING/VENTILATION/COOLING THERMOSTATS

(71) Applicant: Current Lighting Solutions LLC, East Cleveland, OH (US)

(72) Inventors: Na Cheng, San Ramon, CA (US); Ye Yan, Melbourne (AU)

(73) Assignee: CURRENT LIGHTING SOLUTIONS, LLC, East Cleveland, OH (US)

( * ) Notice: Subject to any disclaimer, the term of this patent is extended or adjusted under 35 U.S.C. 154(b) by 154 days.

(21) Appl. No.: 15/904,319

(22) Filed: Feb. 24, 2018

(65) Prior Publication Data
US 2019/0264942 A1 Aug. 29, 2019

(51) Int. Cl.
*F24F 11/62* (2018.01)
*F24F 11/89* (2018.01)
(Continued)

(52) U.S. Cl.
CPC .............. *F24F 11/62* (2018.01); *F24F 11/30* (2018.01); *F24F 11/56* (2018.01); *F24F 11/70* (2018.01);
(Continued)

(58) Field of Classification Search
CPC .... F24F 1/00; F24F 11/30; F24F 11/56; F24F 11/62; F24F 2110/00; G05B 15/02;
(Continued)

(56) References Cited

U.S. PATENT DOCUMENTS 5,839,654 A * 11/1998 Weber ................ G05D 23/1905
236/47
7,987,003 B2 * 7/2011 Hoffberg ................ G05B 15/02
370/200

(Continued)

OTHER PUBLICATIONS

Kessman, Karel J. "System Identification an Introduction", Advanced Textbooks in Control and Signal Processing, Springer, 2011, Chapter 6, pp. 113-116, 11 pp.

*Primary Examiner* — Crystal J Barnes-Bullock
(74) *Attorney, Agent, or Firm* — Buckley, Maschoff & Talwalkar, LLC

(57) ABSTRACT

A method of generating coordinated roof top unit (RTU) control commands includes selecting a building segment, accessing a model corresponding to the segment, training the model with historical data, segment layout data, and heating/ventilation/cooling (HVC) configuration, pushing the trained model to a wireless area controller in communication with thermostats in the segment, optimizing the trained first model using aggregated monitored data provided by sensors distributed in the segment, generating control commands to coordinate the operation of the thermostats, providing the control commands to the thermostats, receiving monitored data from the sensors, aggregating the received monitored data, and the wireless area controller optimizing and/or updating the model with the aggregated received data. A system to implement the method and a non-transitory computer-readable medium containing executable instructions are also disclosed.

20 Claims, 2 Drawing Sheets

(51) Int. Cl.
  *F24F 11/70* (2018.01)
  *F24F 11/30* (2018.01)
  *F24F 11/56* (2018.01)
  *G05B 17/02* (2006.01)
  *G05B 15/02* (2006.01)
  *G05D 23/19* (2006.01)
  *F24F 110/00* (2018.01)

(52) U.S. Cl.
  CPC .............. *F24F 11/89* (2018.01); *G05B 15/02* (2013.01); *G05B 17/02* (2013.01); *G05D 23/1905* (2013.01); *F24F 2110/00* (2018.01); *G05B 2219/2639* (2013.01); *G05B 2219/2642* (2013.01)

(58) Field of Classification Search
  CPC ............ G05B 17/02; G05B 2219/2639; G05B 2219/2642; G05D 23/1905
  See application file for complete search history.

(56) References Cited

U.S. PATENT DOCUMENTS

| | | | |
|---|---|---|---|
| 9,535,563 B2* | 1/2017 | Hoffberg | G05B 15/02 |
| 2017/0051933 A1* | 2/2017 | Verhoeven | G05B 15/02 |
| 2017/0051934 A1* | 2/2017 | Verhoeven | G05B 15/02 |
| 2017/0102681 A1* | 4/2017 | Verhoeven | G05B 17/02 |

* cited by examiner

GENERATION OF COORDINATED CONTROL COMMANDS FOR GROUPINGS OF HEATING/VENTILATION/COOLING THERMOSTATS

BACKGROUND

Buildings are responsible for about 40% of the total primary energy usage in the U.S. The energy consumption for many commercial buildings is primarily driven by the building's heating/cooling demand. While there are reasons to maintain a steady temperature and comfort range for the building, there can be periods of time when this range need not be so rigidly maintained—e.g., work holidays, empty spaces, evenings, etc. By efficiently controlling a heating, ventilation, and air conditioning (HVAC) system (e.g., an HVAC roof-top unit (RTU)), energy usage and associated cost reduction can be achieved.

DETAILED DESCRIPTION

Embodying systems and methods provide efficient operation and control of one or more heating, ventilation, and/or air conditioning sources in a building (e.g., a retail store, office building, sporting arena, manufacturing plant, etc.). In accordance with embodiments, the operation of a heating, ventilation, and/or air conditioning source for a corresponding, predetermined segment of a building is controlled to achieve coordination of operation based on thermal loads, peak demand pricing, and time-of-day. A building can be partitioned into more than one predetermined segment (i.e., spatial partition) based on usage and building configuration considerations—e.g., different building levels, different utilization, etc.). This coordination of operation can result in cost and/ or carbon footprint reduction for the building.

The heating, ventilation, and/or cooling source(s) can be a furnace, boiler, water cooling tower, air conditioning compressor, HVAC RTU, a combination thereof, and the like. In some implementations, a building might have a heating plant and a separate cooling plant; in other buildings an HVAC RTU can be used for both heating and cooling. For purposes of discussion, embodying systems and methods for an HVAC RTU are disclosed. However, the invention is not so limited, and other sources of heating, ventilation, and cooling are within the scope of this disclosure.

In accordance with embodiments, a cloud-based computational platform trains an RTU operational model based on the historical operational data of the RTUs for each of the segments within the building. The trained model is provided to a local computational device, to periodically predict the future responses of RTUs and to generate optimized control signals for control of the RTUs, sometimes through thermostat slaving. Thermostat slaving control signals direct the RTU to provide heat/cooling to a corresponding particular building segment. The trained model can be updated actively based on the dynamic environmental data provided by a grouping of sensors located within the building's segment(s).

Coordinated control of RTUs within a building can achieve a reduction in peak demand usage (e.g., for certain segments an RTU might not need to operate during demand periods based on usage patterns). Also, a reduction in overall energy usage across the building can be achieved by the coordinated control of multiple RTUs to maintain a comfort level (e.g., thermal coupling (spillover) between segments can reduce the need to operate an RTU).

Figure 1:
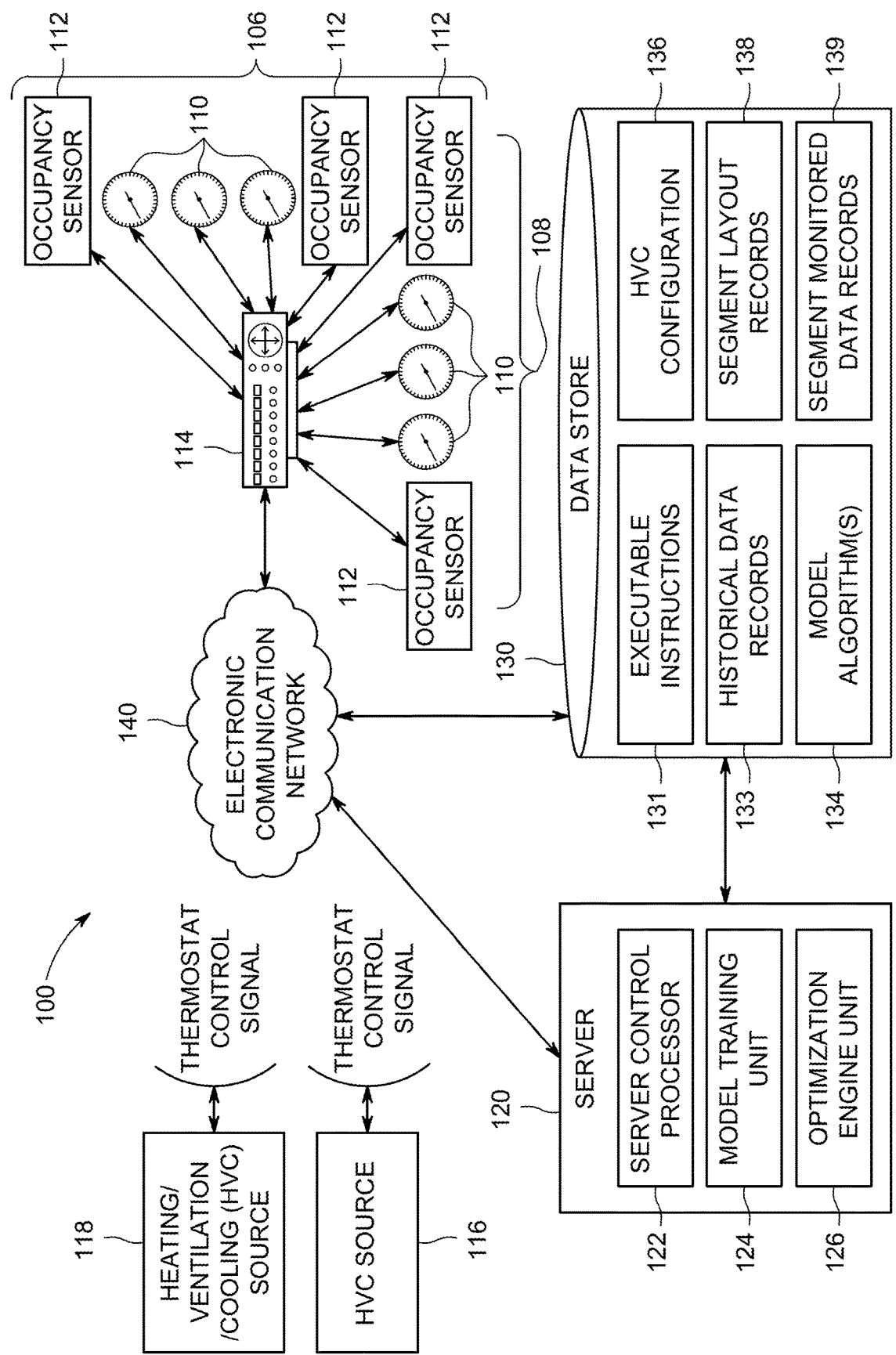
FIG. 1 depicts a system for coordinated RTU control through thermostats in accordance with embodiments.

FIG. 1 depicts system 100 for the coordinated control of RTUs in accordance with embodiments. Sensors (e.g., thermostats 110 and occupancy sensors 112) can be organized in groupings to monitor building segments 106, 108. Thermostats 110 can monitor the ambient temperature of its corresponding segment, and provide control signals to a corresponding heating/ventilation/cooling (HVC) source 116, 118 (e.g., an RTU). The thermostat control signal can be across a hardwired or wireless communication path. The occupancy sensor or other status device can be used to determine occupancy of a segment.

A sensor (e.g., temperature sensor, occupancy sensor, and/or other status monitoring device) can be in communication with network edge device 114—for example, a wireless area controller (WAC). The communication between the sensor and WAC can be across a hardwired or wireless communication path. In some implementations, the wireless communication path can be by a short range wireless communication protocol (e.g., Bluetooth, ZigBee, low energy Bluetooth, near field communication, Airplay, etc.). Communication can be implemented in a variety of protocols including, but not limited to, Modbus, BACnet, etc. The WAC can receive monitored data originating from one or more sensors in each group, and aggregate the monitored data into respective records representing multiple respective segments. For purposes of discussion, only one WAC and two segments are depicted in FIG. 1. It should be readily understood that more than one WAC and two segments can be implemented in a building.

The sensor(s) and WAC(s) can be divided among two tiers of edge devices. Tier 1 devices can include the sensors—e.g., temperature sensors, occupancy sensors, etc. Tier 2 devices can include a computational device along with memory and executable instructions. The Tier 2 computational device can have sufficient computational power to perform operations disclosed herein, for example, but not limited to, a microprocessor, microcontroller, a field programmable gate array, discrete analog circuitry, digital circuitry, an application specific integrated circuit, a digital signal processor, a reduced instruction set computer processor, a single-board computer, etc.

System 100 can include server 120, which includes server control processor 122. Operation, communication and other functions of the server can be performed under the control of server control processor 122. Communicatively coupled to server 120 is data store 130 where executable program instructions 131 can be stored. Data store 130 can include a repository of historical data records 133, model algorithm(s) 134, RTU configuration data 136, and segment layout records 138—all of which can be accessed by the server.

Historical data records 133 can include information regarding RTU runtime, historic temperature data for one or more segments (from the same or multiple buildings), RTU set points correlated to monitored thermal data, etc. This historical data can be accessed by model training unit (MTU) 124 to provide the MTU with a basis to formulate a prediction of an expected RTU performance. The MTU can train one or more of model algorithm(s) 134. Training of a model algorithm also incorporates information of the RTU configuration (BTU, air handling capacities, efficiency, maintenance history, etc.) stored in RTU configuration data 136. Also used by the MTU to train a model algorithm are segment layout records 138, which can contain a segment's physical layout (which in some implementations can include whether one or more RTUs are serving the same and/or adjacent space). Optimization engine unit 126 can apply segment monitored data records 139 to improve the match of the trained model to actual performance conditions of the corresponding segment. The segment monitored data can be aggregated by WAC 114 at predetermined intervals and sent to the data store. Segment monitored data 139 can be included in historical data records 133 in a subsequent time frame.

In some embodiments, data store 130 can be in communication with the server directly or across electronic communication network 140. Electronic communication network 140 can be, can comprise, or can be part of, a private internet protocol (IP) network, the Internet, an integrated services digital network (ISDN), frame relay connections, a modem connected to a phone line, a public switched telephone network (PSTN), a public or private data network, a local area network (LAN), a metropolitan area network (MAN), a wide area network (WAN), a wireline or wireless network, a local, regional, or global communication network, an enterprise intranet, any combination of the preceding, and/or any other suitable communication means. It should be recognized that techniques and systems disclosed herein are not limited by the nature of network 140.

Server 120 and data store 130 can form a cloud-based computational platform that can use the remotely provided monitored data to train a predictive model, which is then provided to a location remote from the cloud-based computational platform for use in RTU operational control. One such cloud-based computational platform suitable to implement embodying systems and methods is the Predix™ platform available from GE. The Predix™ platform embodies Asset Management Platform (AMP) technology that implements cloud-based computational techniques and development tools to bridge gaps between software and operations.

In accordance with embodiments, a first phase includes training a model algorithm corresponding to a particular segment. The model training includes accessing historical data records 133, RTU configuration data 136, and segment layout records 138 to train the corresponding model algorithm. Because model parameters are influenced by factors within these data records, a model algorithm is specific to a particular segment corresponding to these data items—i.e., the model is specific to a particular RTU and the corresponding segment space under its control.

Given the staging run-times (u) of a set of RTUs and a corresponding space temperature (y) data sampled at predetermined intervals (e.g., about every tenth, quarter, half, full hour, or other interval), parameters of the following state-space model can be computed:

$$X(t+1)=AX(t)+BU(t)+KE(t) \qquad (EQ. 1)$$

$$Y(t)=CX(t)+DU(t) \qquad (EQ. 2)$$

Where $E(t)=Y(t)-\hat{Y}(t|t-1)$ (EQ. 3)

Where:

X(t) is the state of the system being modeled at time t;

A is the state transition matrix that affects the next system state based on the current state;

B is a matrix that captures how the next system state is affected by the current input U(t);

C is a matrix specifies how the current measurement Y(t) is affected by the current state X(t);

D is usually assumed to be a matrix of zeros for most systems as there is a finite delay for the system to respond to the current input U(t); and K represents a matrix associated with a noise factor.

The model parameters A, B, C and K can be estimated through various machine learning approaches—for example, an auto-regressive with exogenous input (ARX) model based on the least squares criterion, an autoregressive integrated moving average (ARIMA) model, and the like.

The computed model (M) can be provided to WAC 114, and/or remain within the cloud platform, to predict and optimize the temperature set range at a reduced cost (compared to not implementing embodying systems and methods) by solving an optimization problem at periodic intervals. Optimization refines the model so as to optimize its prediction of a temperature set range for a preidentified time in the future. In some implementations, model optimization can be achieved by applying a model predictive control (MPC) technique. During model optimization, the trained model and current aggregated segment data collected by WAC 114 for the corresponding segment is applied in MPC operations. The model prediction value can be compared to a boundary range (e.g., where a temperature setting is within the boundary range) to keep the temperature set up within the user acceptable range.

By way of illustration, a model can predict the current space temperature based on current state of the system and matrix Ca from the trained model as given below.

$$y(k)=C_a\hat{X}_a(k) \qquad (EQ. 4)$$

Where:

$\hat{X}_a$ is the stored state of the system; and y(k) is the predicted output of the system based on the current system state estimate.

Compute innovation value e(k) as:

$$e(k)=y(k)-\hat{y}(k|k-1). \qquad (EQ. 5)$$

The state of the system can be updated using the Equation 6:

$$\hat{X}_a(k+1)=A_a\hat{X}_a(k)+B_au(k)+K_ae(k) \qquad (EQ. 6)$$

Where:

u(k) is the previous input to the system: and $A_a$, $B_a$, $C_a$ and $K_a$ are parameters of the trained model.

After the state of the system has been updated, the optimization problem can be formulated as shown in Equation 7:

$$\min_{u \in \{0,1\}^m} \left( \sum_{i=1}^{m} P_i u_i \right) \times d \times T_s \qquad (EQ. 7)$$

s.t.

$T_l \leq E(y(k+d)|\mathcal{G}_k) \leq T_u$ $u_i \in \{0, 1\}$ $E(y(k+d)|\mathcal{G}_k) =$ $\qquad C_a A_a^d \hat{x}_a(k) + C_a(A_a^{d-1} + A_a^{d-2} + \ldots + I)B_a u(k).$ Where:

$P_i$ is the rated power or efficiency of a stage;

$u_i$ the staging decision to be manipulated so as to minimize the objective function;

$E(y(k+d))$ is the expected space temperature d time steps into the future that is predicted based on model parameters $A_a$, $B_a$, $C_a$ and $K_a$ and updated system state in the previous step; and $T_l$ and $T_u$ are derived from the setpoint for comfort level in each of the zones that the RTU is controlling.

The optimization problem can be a linear programming problem that can be solved periodically at predetermined intervals based on the interval of monitored data provided by the segment sensors. The WAC can apply the model to generate control commands that are sent to the thermostats of the corresponding segment. These control commands instruct the thermostats to adjust set points to meet the set points determined from the optimization phase disclosed above.

In accordance with embodiments, a model can be trained at a server remote from a building segment using historical data available to a cloud-based computational platform (e.g., PREDIX™). Periodically, the WAC for a segment can pull down segments layout records that provide configuration details of a controlled segment. Also, a trained model can be pushed to the WAC from the cloud-based computational platform, or pulled by the WAC. The model can be kept in storage memory, or device, local to the WAC for subsequent use. The WAC can use more recent aggregated data from the segment sensors to perform local retraining of the model. Because of limited computing power at the WAC, this local retraining is more limited than the original training optimized at the cloud-based computational platform.

Figure 2:
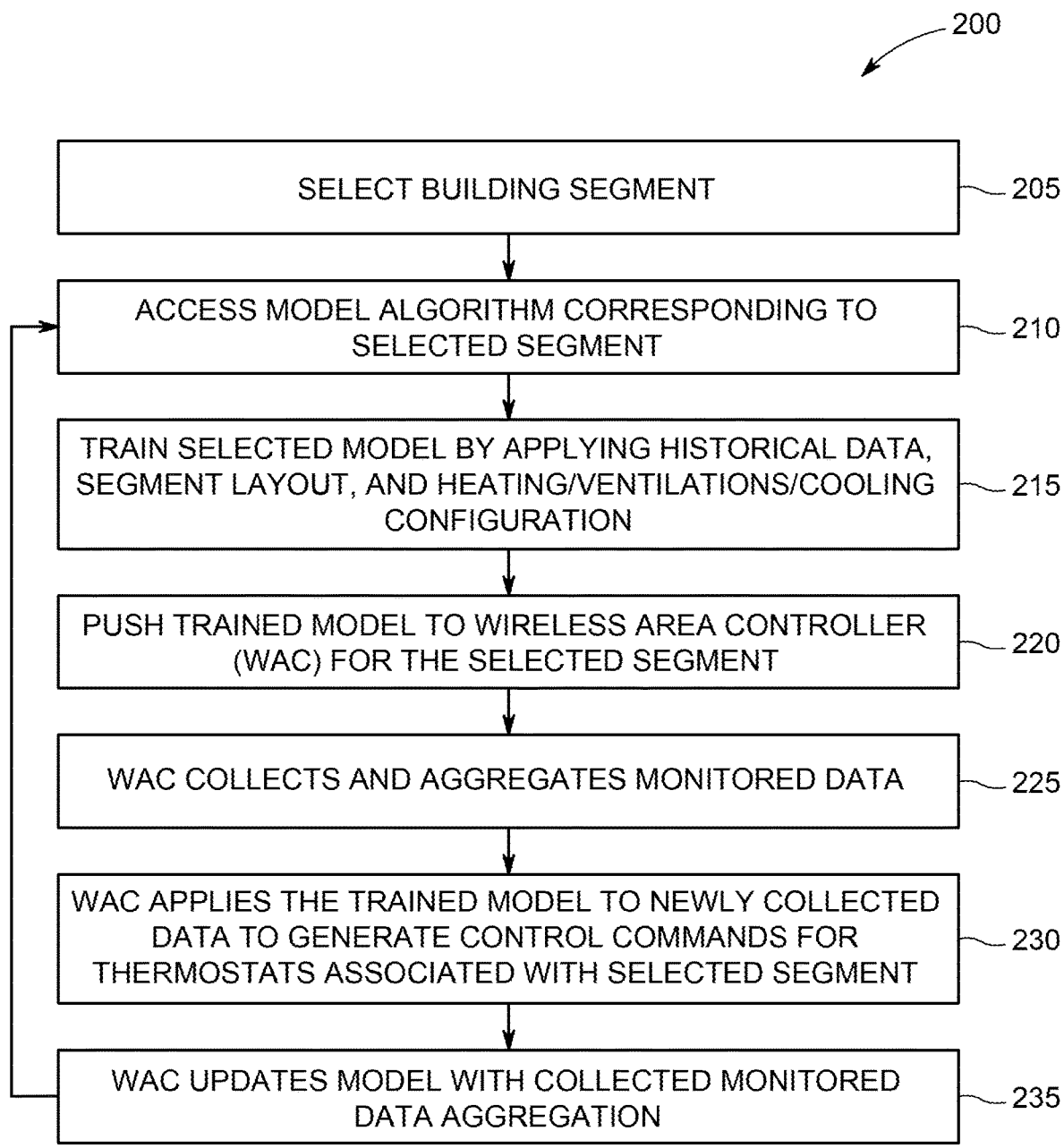
FIG. 2 depicts a process flowchart of generating coordinated RTU control commands in accordance with embodiments.

FIG. 2 depicts a flowchart of process 200 for generating coordinated thermostat control commands in accordance with embodiments. A first building segment is selected, step 205. The building segment can have more than one thermostat, where each thermostat provides control signals to an associated HVC system (e.g., an RTU). In some implementations, the number of thermostats can be equal to the number of RTUs. A segment could have more than one RTUs to apply RTU control signals. Multiple space temperature sensors could connect to one thermostat, where the thermostat call favor a mean value from those sensors rather than its internal temperature sensor.

Model training unit 124 accesses, step 210, a model algorithm that corresponds to the selected segment from model algorithm storage 134. The model algorithm is trained by applying machine learning approaches to historical data records 133, HVC configuration 136, and segment layout records 138, step 215.

The trained model is pushed, step 220, to the WAC associated with the selected segment. The WAC collects new monitored data and aggregates the new data into historical data, step 225. The WAC applies the trained model to newly collected data to generate control commands for thermostats associated with selected segment(s), step 230.

The model is updated, step 235, with the monitored data aggregation. The generation of thermostat control commands, collection of data, and model update can continue in a loop by return to step 210.

Even though there are local updates made to the model (step 230), because of the limited computational capacity of the WAC, the model can drift and its prediction of control commands can fall outside the threshold window for maintaining the set points. Accordingly in some implementations, a model is periodically trained in the cloud and is pushed to the WAC (step 220). In some implementations, the WAC can request that the cloud computing platform provide the new model.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable instructions that when executed may instruct and/or cause a controller or processor to perform methods discussed herein such as a method for generating control commands that coordinate RTU operations across a building's spatial segment, as described above.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

We claim:

1. A method of generating control commands to coordinate roof top unit (RTU) operation across a segment of a building, the method comprising:
    a server (120) selecting a first segment (106, 108) from a plurality of building segments, each building segment being a volumetric portion of the building, and the server located remote from the building;
    accessing a first model algorithm (134) corresponding to the first segment;
    training the first model by applying at least one of historical data (133), segment layout records (138), and heating/ventilation/cooling (HVC) configuration (136), the segment layout data, and the HVC configuration each containing data corresponding to the first segment;
    pushing the trained first model to a wireless area controller edge device (114), the wireless area controller edge device being in communication with one or more thermostats positioned in the first segment;
    optimizing the trained first model using aggregated monitored data, the monitored data provided by sensors (110, 112) distributed in the first segment;
    generating control commands to coordinate the operation of the one or more thermostats (110) in the first segment;
    providing the generated control commands to the one or more thermostats in the first segment;
    receiving monitored data (139) from first segment sensors;
    aggregating the received monitored data; and
    the wireless area controller edge device performing at least one of an optimization and an update to the first model with the aggregated received data.

2. The method of claim 1, the historical data containing data corresponding to the first segment.

3. The method of claim 1, including the first model predicting the RTU operational performance for the first segment.

4. The method of claim 1, including providing monitored time series data from the sensors, and using the monitored time series data during at least one of the training and the optimizing of the first model.

5. The method of claim 1, including applying a predetermined boundary range in generating the control commands.

6. The method of claim 1, including performing the optimizing of the first model at predetermined time intervals, the interval based on a monitoring interval applied to acquiring monitored data at the sensors.

7. The method of claim 1, including the wireless area controller edge device requesting from the server an updated model for a corresponding segment.

8. The method of claim 1, including the wireless area controller edge device communicating with other segments in the building, and creating respective aggregations of data based on monitored data received from sensors in the other segments.

9. A non-transitory computer readable medium containing computer-readable instructions (131) stored therein for causing a control processor (122) to perform operations of generating control commands to coordinate roof top unit (RTU) operation across a spatial segment of a building, the operations comprising:
a server (120) selecting a first segment (106, 108) from a plurality of building segments, each building segment being a volumetric portion of the building, and the server located remote from the building;
accessing a first model algorithm (134) corresponding to the first segment;
training the first model by applying at least one of historical data (133), segment layout records (138), and heating/ventilation/cooling (HVC) source configuration (136), the segment layout data, and the HVC configuration each containing data corresponding to the first segment;
pushing the trained first model to a wireless area controller edge device (114), the wireless area controller edge device being in communication with one or more thermostats (110) positioned in the first segment;
optimizing the trained first model using aggregated monitored data, the monitored data provided by sensors (110, 112) distributed in the first segment;
generating control commands to coordinate the operation of the one or more thermostats in the first segment;
providing the generated control commands to the one or more thermostats in the first segment;
receiving monitored data from first segment sensors;
aggregating the received monitored data; and
the wireless area controller edge device performing at least one of an optimization and an update to the first model with the aggregated received data.

10. The non-transitory computer readable medium of claim 9, including executable instructions that cause the control processor to perform the method by including the first model predicting the RTU operational performance for the first segment.

11. The non-transitory computer readable medium of claim 9, including executable instructions that cause the control processor to perform the method by providing monitored time series data from the sensors, and using the monitored time series data during at least one of the training and the optimizing of the first model.

12. The non-transitory computer readable medium of claim 9, including executable instructions that cause the control processor to perform the method by applying a predetermined boundary range in generating the control commands.

13. The non-transitory computer readable medium of claim 9, including executable instructions that cause the control processor to perform the method by performing the optimizing of the first model at predetermined time intervals, the interval based on a monitoring interval applied to acquiring monitored data at the sensors.

14. The non-transitory computer readable medium of claim 9, including executable instructions that cause the control processor to perform the method by responding to a request from the wireless area controller for the server to provide an updated model for a corresponding segment.

15. The non-transitory computer readable medium of claim 9, including executable instructions that cause the wireless area controller to receive communications from other segments in the building, and creating respective aggregations of data based on monitored data received from sensors in the other segments.

16. A system for generating control commands to coordinate roof top unit (RTU) operation across a first spatial segment of a building, the system comprising:
a first plurality of sensors (110, 112) distributed throughout the first spatial segment (106, 108);
one or more other pluralities of sensors distributed throughout other spatial segments of the building;
sensors within each of the first plurality and the one or more other pluralities of sensors forming respective groupings of sensors for each respective spatial segment of the building;
a wireless area controller (114) in communication with each of the sensor groupings, the wireless area controller configured to receive monitored data from each sensor;
a server (120) remote from the wireless area controller, and in communication with the wireless area controller across an electronic communication network (140);
a data store (130) in communication with the server, the data store containing historical data records (133), segment layout records (138) for each respective sensor grouping, heating/ventilation/cooling (HVC) source configuration (136) for each respective sensor grouping, and executable instructions (131);
the server including a control processor (122) configured to access the executable instructions, the executable instructions configured to cause the control processor to perform a method including:
selecting a first segment from a plurality of building segments, each building segment being a volumetric portion of the building, and the server located remote from the building;
accessing a first model algorithm (134) corresponding to the first segment;
a model training unit (124) training the first model by applying at least one of the historical data, the segment layout record, and the HVC configuration, the segment layout record and the HVC configuration each containing data corresponding to the first segment;
pushing the trained first model to a wireless area controller edge device (114), the wireless area controller edge device being in communication with one or more thermostats (110) positioned in the first segment;

an optimization engine unit (126) optimizing the trained first model using aggregated monitored data, the monitored data provided by sensors distributed in the first segment;
generating control commands to coordinate the operation of the one or more thermostats in the first segment;
providing the generated control commands to the one or more thermostats in the first segment;
receiving monitored data from first segment sensors;
aggregating the received monitored data; and
the wireless area controller edge device performing at least one of an optimization and an update to the first model with the aggregated received data.

17. The system of claim 16, the executable instructions configured to cause the control processor to perform the method by including:
the first model predicting the RTU operational performance for the first segment; and
determining a set point range, the set point range based on a predetermined threshold window.

18. The system of claim 16, the executable instructions configured to cause the control processor to perform the method by including applying a predetermined boundary range in generating the control commands.

19. The system of claim 16, the executable instructions configured to cause the control processor to perform the method by including performing the optimizing of the first model at predetermined time intervals, the interval based on a monitoring interval applied to acquiring monitored data at the sensors.

20. The system of claim 16, the executable instructions configured to cause the control processor to perform the method by including responding to a request from the wireless area controller for the server to provide an updated model for a corresponding segment.

* * * * *